(12) United States Patent
Mao et al.

(10) Patent No.: US 9,369,060 B2
(45) Date of Patent: Jun. 14, 2016

(54) POWER GENERATION SYSTEM AND PACKAGE

(71) Applicant: General Electric Company, Schenectady, NY (US)

(72) Inventors: Saijun Mao, Shanghai (CN); Denis Perrillat-Amede, Paris (FR); Philippe Ernest, Gif sur Yvette (FR); Niranjan Kumar, Bangalore (IN); Xu Chu, Shanghai (CN)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 0 days.

(21) Appl. No.: 13/733,925

(22) Filed: Jan. 4, 2013

(65) Prior Publication Data
US 2014/0205072 A1 Jul. 24, 2014

(30) Foreign Application Priority Data
Jan. 6, 2012 (CN) .......................... 2012 1 0003660

(51) Int. Cl.
*H01J 35/02* (2006.01)
*H02M 7/10* (2006.01)
*H05G 1/10* (2006.01)

(52) U.S. Cl.
CPC ............ *H02M 7/103* (2013.01); *H01J 35/025* (2013.01); *H05G 1/10* (2013.01)

(58) Field of Classification Search
CPC ............ H05G 1/10; H05G 1/06; H05G 1/12; H05G 1/32; H05G 1/20; H05G 1/02; H05G 1/08
See application file for complete search history.

(56) References Cited

U.S. PATENT DOCUMENTS

| 4,995,069 A | 2/1991 | Tanaka |
| 7,050,539 B2 | 5/2006 | Loef |
| 7,672,432 B2 | 3/2010 | Bosello |

(Continued)

FOREIGN PATENT DOCUMENTS

| CN | 101128082 A | 2/2008 |
| CN | 101238633 A | 8/2008 |

(Continued)

OTHER PUBLICATIONS

Search Report and Written Opinion, dated Oct. 9, 2014, by French Patent Office in relation to FR Application No. 1262829.
Unofficial English Translation of Chinese Office Action and Search Report issued in connection with corresponding CN Application No. 201210003660.6 dated Mar. 23, 2015.

*Primary Examiner* — Hoon Song
(74) *Attorney, Agent, or Firm* — GE Global Patent Operation; Marc A. Vivenzio

(57) ABSTRACT

A power generation system includes an input to receive a low-voltage alternating current and a number N of voltage-conversion modules coupled to the input, each electrically connected in series. Each voltage-conversion module includes a transformer configured to convert the low-voltage alternating current into a high-voltage alternating current. Each voltage-conversion module includes a multiplier configured to convert the high-voltage alternating current from the transformer into a high-voltage direct current. The multiplier includes a positive multiplier part and a negative multiplier part. The positive multiplier part and the negative multiplier part each includes a pair of input terminals connected in parallel with the transform and at least one multiplier stage comprising a single diode and a capacitor assembly. The number N is an even number between 4 and 24.

8 Claims, 3 Drawing Sheets

(56) References Cited

U.S. PATENT DOCUMENTS 7,944,719 B2 5/2011 Luerkens
2010/0301985 A1* 12/2010 Luo et al. .................. 336/221

FOREIGN PATENT DOCUMENTS

| EP | 2063519 A1 | 5/2009 |
| JP | 1177873 A | 7/1989 |

* cited by examiner

POWER GENERATION SYSTEM AND PACKAGE

BACKGROUND OF THE INVENTION

High-voltage power generation systems are used, for example, for supplying regulated high-voltage direct current (DC) to a vacuum tube, which pushes electrons to flow from a cathode to an anode and generates X-ray emission. The power generation system typically comprises a transformer module which has a high secondary-to-primary turns ratio and converts a relatively low-voltage alternating current (AC) to a relatively high-voltage AC. The power generation system may further comprise a voltage multiplier module which utilizes diodes and capacitors to further boost the high-voltage AC from a secondary winding of the transformer module, as well as to convert the high-voltage AC into the targeted high-voltage DC.

In a conventional power generation system, the transformer module includes at least two transformers and the multiplier module includes at least two multipliers electrically connected in series and each coupled to a corresponding transformer. When the number of the multipliers is too small, in order to achieve a high-voltage DC output, each multiplier must include many diodes of one type coupled in series and capacitors coupled in series, and the capacitors must have large capacitances. The diodes in series exhibit a voltage unbalance effect due to a reverse recovery process of the inconsistent series diodes, and induce over voltage damage. When the number of the multipliers is too large, the multipliers and the transformers need a lot of room, which in turn results in a bulky package and an increased cost.

BRIEF DESCRIPTION OF THE INVENTION

In accordance with an embodiment of the present invention, a power generation system is provided. The power generation system comprises an input to receive a low-voltage alternating current and a number N of voltage-conversion modules coupled to the input, each electrically connected in series. Each voltage-conversion module comprises a transformer configured to convert the low-voltage alternating current into a high-voltage alternating current. Each voltage-conversion module further comprises a multiplier configured to convert the high-voltage alternating current from the transformer into a high-voltage direct current. The multiplier comprises a positive multiplier part, and a negative multiplier part. The positive multiplier part and the negative multiplier part each includes a pair of input terminals connected in parallel with the transform and at least one multiplier stage comprising a single diode and a capacitor assembly. The number N is an even number between 4 and 24.

In accordance with an embodiment of the present invention an X-ray generation system is provided. The X-ray generation system comprises a power source for providing a low-voltage alternating current; an X-ray tube comprising an anode and a cathode; and a power generation system configured to convert the low-voltage alternating current from the power source into a high-voltage direct current supplied to the X-ray tube. The power generation system comprises a number N of voltage-conversion modules electrically connected in series, each of said modules comprising: a transformer coupled to the power source configured to convert the low-voltage alternating current into a high-voltage alternating current; and a multiplier configured to convert the high-voltage alternating current from the transformer into the high-voltage direct current. The multiplier comprises a positive multiplier part and a negative multiplier part, the positive multiplier part and the negative multiplier part each comprising a pair of input terminals connected in parallel with the transform and at least one multiplier stage comprising a single diode and a capacitor assembly. The number N is an even number between 4 and 24.

In accordance with an embodiment of the present invention, a power generation package is provided. The power generation package comprises a printed circuit board carrying a plurality of electronic elements comprising surface mounted diodes and surface mounted capacitors; and a number N of transformers each comprising a core, a primary winding and a secondary winding, wherein the secondary winding is electrically coupled to the electronic elements. The number N is an even number between 4 and 24.

BRIEF DESCRIPTION OF THE DRAWINGS

These and other features and aspects of the present disclosure will become better understood when the following detailed description is read with reference to the accompanying drawings in which like characters represent like parts throughout the drawings, wherein.

DETAILED DESCRIPTION OF THE INVENTION

Unless defined otherwise, technical and scientific terms used herein have the same meaning as is commonly understood by one of ordinary skill in the art to which this disclosure belongs. The terms "first", "second", and the like, as used herein do not denote any order, quantity, or importance, but rather are used to distinguish one element from another. Also, the terms "a" and "an" do not denote a limitation of quantity, but rather denote the presence of at least one of the referenced items. The use of "including," "comprising" or "having" and variations thereof herein are meant to encompass the items listed thereafter and equivalents thereof as well as additional items. The terms "connected" and "coupled" are not restricted to physical or mechanical connections or couplings, and can include electrical connections or couplings, whether direct or indirect.

Figure 1:
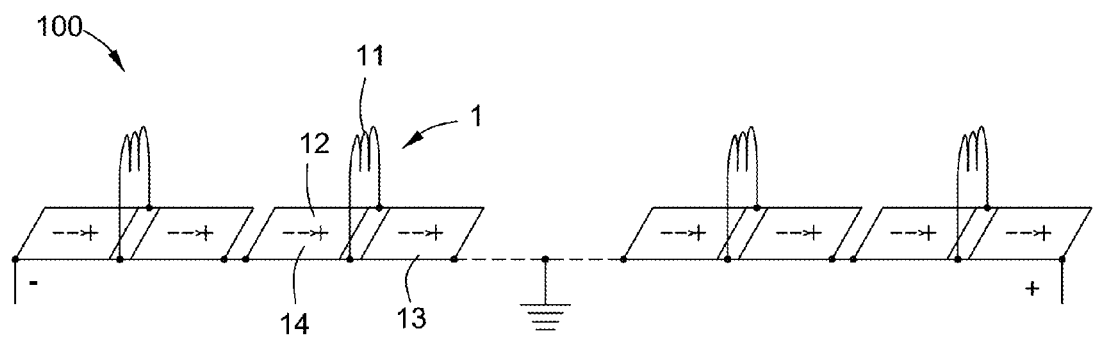
FIG. 1 is a schematic diagram of a power generation system in accordance with an embodiment of the present invention.

Referring to FIG. 1, a power generation system 100 according to an embodiment of the present invention comprises a number N of voltage-conversion modules 1 each electrically connected in series for converting a low-voltage alternating current (AC) into a high-voltage direct current (DC). According to an embodiment of the present invention, the number N is an even number between 4 and 24, including 4 and 24. However, any suitable number of voltage-conversion modules 1 can be used as necessary. Each voltage-conversion module 1 includes a transformer 11 for converting the low-voltage AC into a high-voltage AC and a multiplier 12 electrically coupled to the transformer 11 for further boosting the high-voltage AC from the transformer 11 to an even higher-voltage AC as well as converting the higher-voltage AC into a high-voltage DC.

Figure 2:
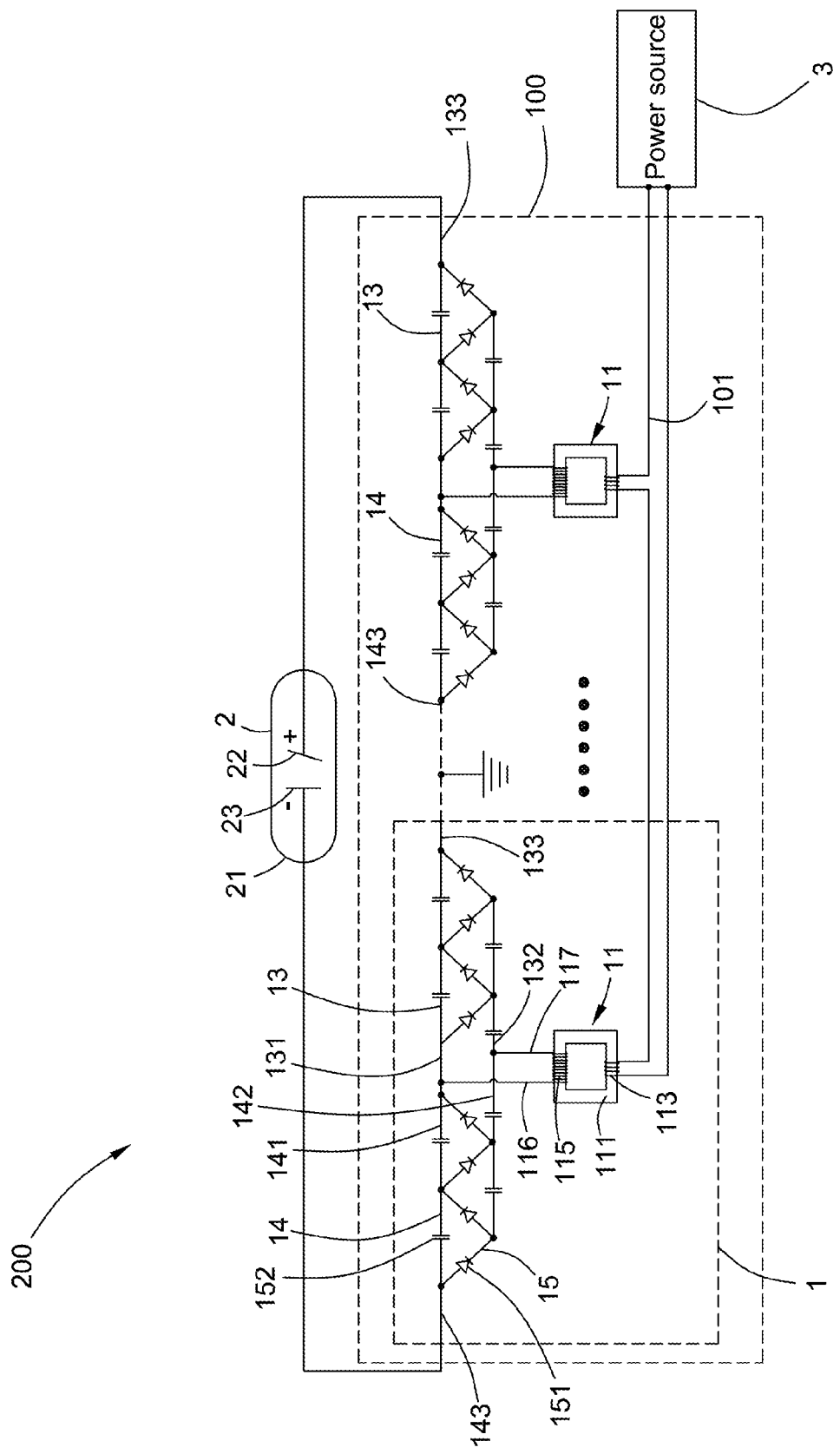
FIG. 2 is a circuit diagram of an X-ray generation system using the power generation system of FIG. 1.

Referring to FIG. 2, an embodiment of the present invention is shown where the power generation system 100 is used in an X-ray generation system 200 for providing a targeted high-voltage DC to an X-ray tube 2. The targeted high-voltage DC is a sum of the high-voltage DCs from the voltage-conversion modules 1. The X-ray tube 2 has a vacuum tube 21, an anode 22 and a cathode 23 electrically coupled to the power generation system 100. The targeted high-voltage DC from the power generation system 100 pushes electrons to flow from the cathode 23 to the anode 22 to induce X-ray emission. In certain embodiments of the present invention, the targeted high-voltage DC applied on the anode 22 and the cathode 23 ranges from 40 kV to 160 kV, for example, for medical application, and an X-ray intensity is between 20 mA to 1 A, for example. However, the targeted high-voltage DC can be set to any value as required by the application. The same is true for the X-ray intensity.

The X-ray generation system 200 comprises a power source 3 for providing the low-voltage AC to the transformers 11 of the power generation system 100. The power generation system 100 comprises an input 101 to receive the low-voltage alternating current from the power source 3. The power source 3 is an AC power source that can output a lower voltage AC signal. In another embodiment, the power source 3 may include a DC power source and an inverter converting a low-voltage DC from the DC power source to a low-voltage AC. In some embodiments, the power source 3 may further comprise a filtering circuit (not shown). In an embodiment of the present invention, a voltage amplitude of the low-voltage AC of the power source 3 may be about a few hundreds of volts, and a switching frequency of the low-voltage AC from the power source 3 ranges from 100 kHz to 1 MHz, for example. The voltage amplitude and switching frequency can be set as necessary for the application.

With continued reference to FIG. 2, in some embodiments of the present invention, the transformer 11 comprises a core 111, a primary winding 113 and a secondary winding 115. The low-voltage AC from the power source 3 is inputted through the primary winding 113. The core 111 is a ferrite core, a nanocrystalline core or one of other cores. The nanocrystalline core can be used when the switching frequency of the low-voltage AC is around 100 kHz. When the switching frequency of the low-voltage AC is high, such as above 300 kHz, the ferrite core is more preferred. In an embodiment of the invention, the primary windings 113 of the transformers 11 are electrically connected in series. In some embodiments of the invention, the primary windings 113 of the transformers 11 are electrically connected in parallel to the power source 3. The secondary winding 115 includes a pair of output terminals 116, 117 through which the high-voltage AC is output. The high-voltage AC output from the transformer 11 ranges from 300 V to 5000 V, for example. However, the high-voltage AC can be set to any value as required by the application.

Referring to FIGS. 1 and 2, each multiplier 12 is a bipolar multiplier and comprises a positive multiplier part 13 and a negative multiplier part 14. The positive multiplier part 13 and the negative multiplier part 14 each comprise a pair of input terminals 131, 132, 141 and 142 connected with the output terminals 116, 117 of the secondary winding 115 in parallel. The positive multiplier part 13 and the negative multiplier part 14 are each a unidirectional multiplier circuit and respectively rectify and amplify the high-voltage AC output of the transformer 11 into a high-voltage positive DC at a positive DC output 133 and a high-voltage negative DC at a negative DC output 143. Output terminals 133, 143 of adjacent multipliers 12 are connected in series, and thus, a total output of the power generation system 100 can be represented as a sum of the output voltages of the multipliers 12 of the voltage-conversion modules 1. The high-voltage DC output from the multiplier 12 ranges from 1.5 kV to 40 kV, for example. However, the high-voltage DC output from the multiplier 12 can be set to any value as required by the application. In some embodiments, the multipliers 12 have the same voltage input from the transformers 11 and the same DC output.

The positive multiplier part 13 and the negative multiplier part 14 each comprise at least one multiplier stage 15 comprising a single diode 151 and a capacitor assembly 152. The diode 151 is not easily damaged by an unequal voltage. The diode 151 can be a surface mounted diode with a voltage rating ranging from 600 V to 10 kV, such as 600 V, 1200 V, 3300 V, 6500 V, 10 kV and so on. The capacitor assembly 152 comprises one or more serially connected capacitors and each capacitor is a surface mounted capacitor with a voltage rating ranging from 600 V to 10 kV, such as 600 V, 1200 V, 3300 V, 6500 V, 10 kV and so on. However, the diodes 151 and the capacitors can be other types and set to any value as required by the application. In some embodiments, the number of the multiplier stages 15 in each of the positive multiplier part 13 and the negative multiplier part 14 is between 2 and 8, including 2 and 8. However, the number of the multiplier stages 15 can be set to any value as required by the application.

Figure 3:
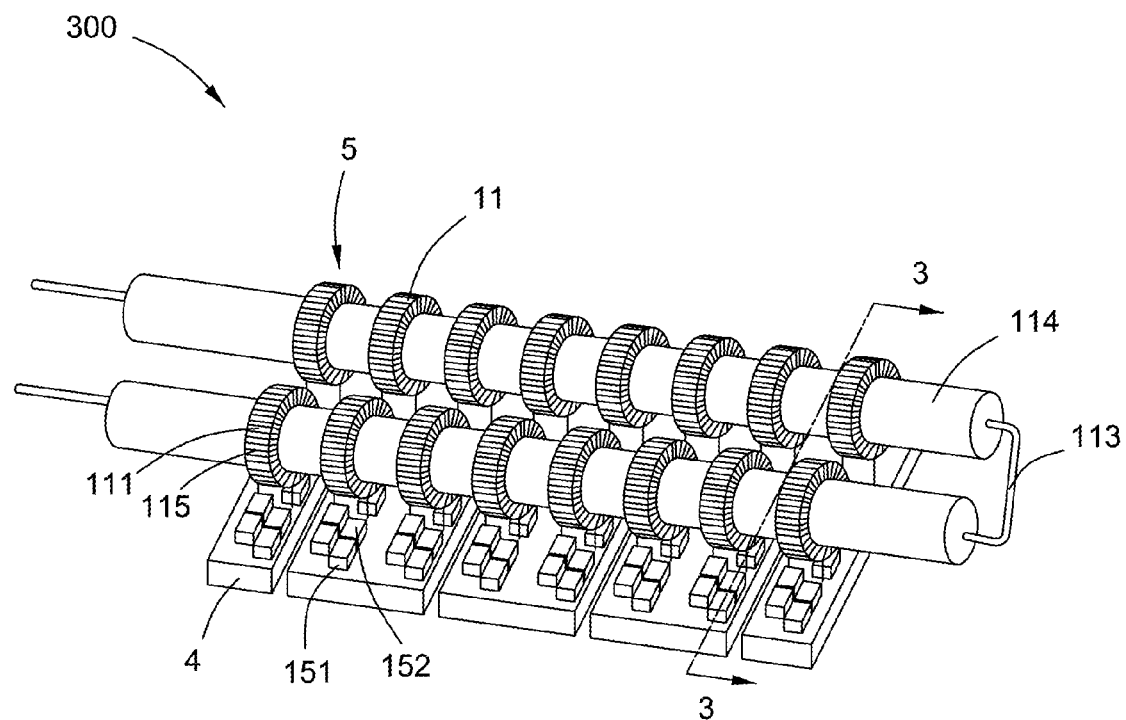
FIG. 3 is a perspective view of a power generation package in accordance with an embodiment of the present invention.
Figure 4:
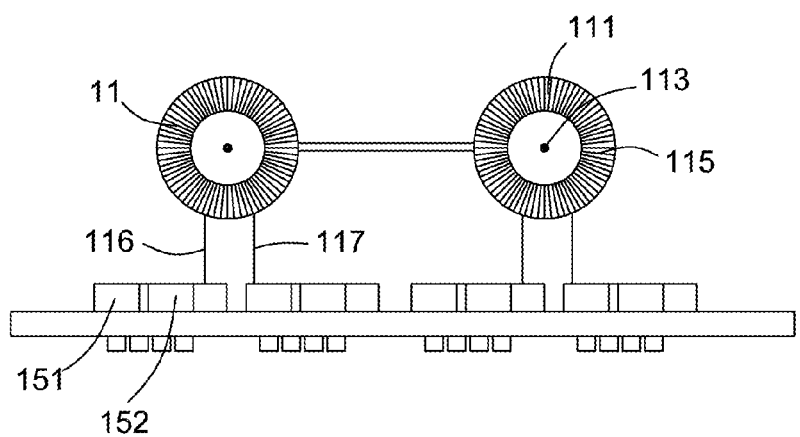
FIG. 4 is a cross-sectional view of the power generation package taken along line 3-3 in FIG. 3.

FIGS. 3 and 4 illustrate a power generation package 300 of the power generation system 100 as described with respect to FIGS. 1 and 2. Referring to FIGS. 3 and 4, the illustrated power generation package 300 comprises a printed circuit board 4 carrying electronic elements 151, 152 and a transformer module 5 assembled by the number N of the transformers 11. The electronic elements 151, 152 include surface mounted diodes 151 and surface mounted capacitors 152 making up the multiplier 12 as described with respect to FIG. 2.

In an embodiment of the invention, the primary windings 113 of the transformers 11 are electrically connected in series and coated by an insulation body 114. The insulation body 114 is made of polypropylene (PP) or other insulation material to insulate the primary windings 113 from the secondary windings 115. Each core 111 is ring-shaped and each secondary winding 115 of the transformers 11 winds around each core 111. The cores 111 encircle the insulation body 114 respectively. The transformer module 5 is located on one side of the printed circuit board 4. The pair of output terminals 116, 117 of the secondary winding 115 extend toward the printed circuit board 4 and are electrically connected to the surface mounted diodes 151 and the surface mounted capacitors 152 on the printed circuit board 4.

The number N of the voltage-conversion modules 1 is optimally determined according to a voltage of the X-ray tube 2 which is the targeted high-voltage DC outputted from the power generation system 100, a current of the X-ray tube 2, the switching frequency of the low-voltage AC from the power source 3, rise and fall speed of the high-voltage DC, as well as voltage ratings of the diodes 151 and the capacitors 152. As the number of voltage-conversion modules 1 increases, the voltage rating of the diode and capacitor can be decreased. However, the complexity and performance also needs to be considered in balance. The number N is an even number between 4 and 24, so that the X-ray generation system 200 can use diodes and capacitors with low voltage ratings, as well as has a low cost and a compact package. Since the diode has a low voltage rating, the multiplier stage 15 can use only one diode to achieve the desired performance and avoid diode damage resulting from an unbalanced voltage.

The higher the switching frequency, the lower capacitance of the capacitor 152 is required. Thereby, the X-ray generation system 200 may use capacitors with lower capacitance. Surface mounted diodes and capacitors have low voltage ratings. So the surface mounted diodes and capacitors can be utilized in the X-ray generation system 200 for thin package. Additionally, the high switching frequency also benefits for high rise and fall speed of the high-voltage DC to reduce X-ray radiation to patients.

While the invention has been described with reference to exemplary embodiments, it will be understood by those skilled in the art that various changes may be made and equivalents may be substituted for elements thereof without departing from the scope of the disclosure. In addition, many modifications may be made to adapt a particular situation or material to the teachings of the invention without departing from the essential scope thereof.

Furthermore, the skilled artisan will recognize the interchangeability of various features from different embodiments. The various features described, as well as other known equivalents for each feature, can be mixed and matched by one of ordinary skill in this art to construct additional systems and techniques in accordance with principles of this disclosure.

What is claimed is:

1. A power generation system, comprising:
   an input to receive a low-voltage alternating current;
   a number N of voltage-conversion modules electrically coupled to the input, each voltage-conversion module electrically connected together and to the input in series, and each voltage-conversion module comprising:
      a transformer configured to convert the low-voltage alternating current into a high-voltage alternating current; and
      a multiplier configured to convert the high-voltage alternating current from the transformer into a high-voltage direct current, the multiplier comprising a positive multiplier part and a negative multiplier part, the positive multiplier part and the negative multiplier part each comprising a pair of input terminals connected in parallel with the transformer, and at least one multiplier stage comprising a single diode and a capacitor assembly;
   wherein the number N is an even number between 4 and 24.

2. The power generation system of claim 1, wherein the high-voltage alternating current output from the transformer ranges from 300 V to 5000 V.

3. The power generation system of claim 1, wherein the high-voltage direct current output from the multiplier ranges from 1.5 kV to 40 kV.

4. The power generation system of claim 1, wherein the diode is a surface mounted diode with a voltage rating ranging from 600 V to 10 kV.

5. The power generation system of claim 1, wherein the capacitor assembly comprises one or more serially connected capacitors, wherein each capacitor is a surface mounted capacitor with a voltage rating ranging from 600 V to 10 kV.

6. The power generation system of claim 1, wherein a switching frequency of the low-voltage alternating current ranges from 100 kHz to 1 MHz.

7. The power generation system of claim 1, wherein a number of the at least one multiplier stage in each of the positive multiplier part and the negative multiplier part is between 2 and 8.

8. The power generation system of claim 1, wherein a transformer of one of the number N of voltage-conversion modules is connected in series with the input and a transformer of another one of the number N of voltage conversion modules.

* * * * *